United States Patent [19]

Wolf et al.

[11] Patent Number: 5,022,268

[45] Date of Patent: Jun. 11, 1991

[54] PASSIVE ACOUSTICS SYSTEM TO MONITOR FLUIDIZED BED SYSTEMS

[75] Inventors: H. Alan Wolf, Franklin Lakes, N.J.; David L. Chu, Baton Rouge, La.

[73] Assignee: Exxon Research and Engineering Company, Florham Park, N.J.

[21] Appl. No.: 355,540

[22] Filed: May 22, 1989

[51] Int. Cl.$^5$ ............................................. G01N 9/24
[52] U.S. Cl. ................................................... 73/602
[58] Field of Search ............... 73/602, 61 R, 572, 587, 73/861.73, 861.18

[56] References Cited

U.S. PATENT DOCUMENTS 4,285,241 8/1981 Smith et al. ............................ 73/572
4,824,016 4/1989 Cody et al. ......................... 73/861.18

Primary Examiner—Hezron E. Williams
Assistant Examiner—Louis M. Arana
Attorney, Agent, or Firm—Ronald D. Hantman

[57] ABSTRACT

Vibrational Analysis technology translates acoustic/vibratory energy created by industrial processes into useful, process-related information. This invention enables a non-acoustical expert to easily collect and interpret the data.

10 Claims, 16 Drawing Sheets

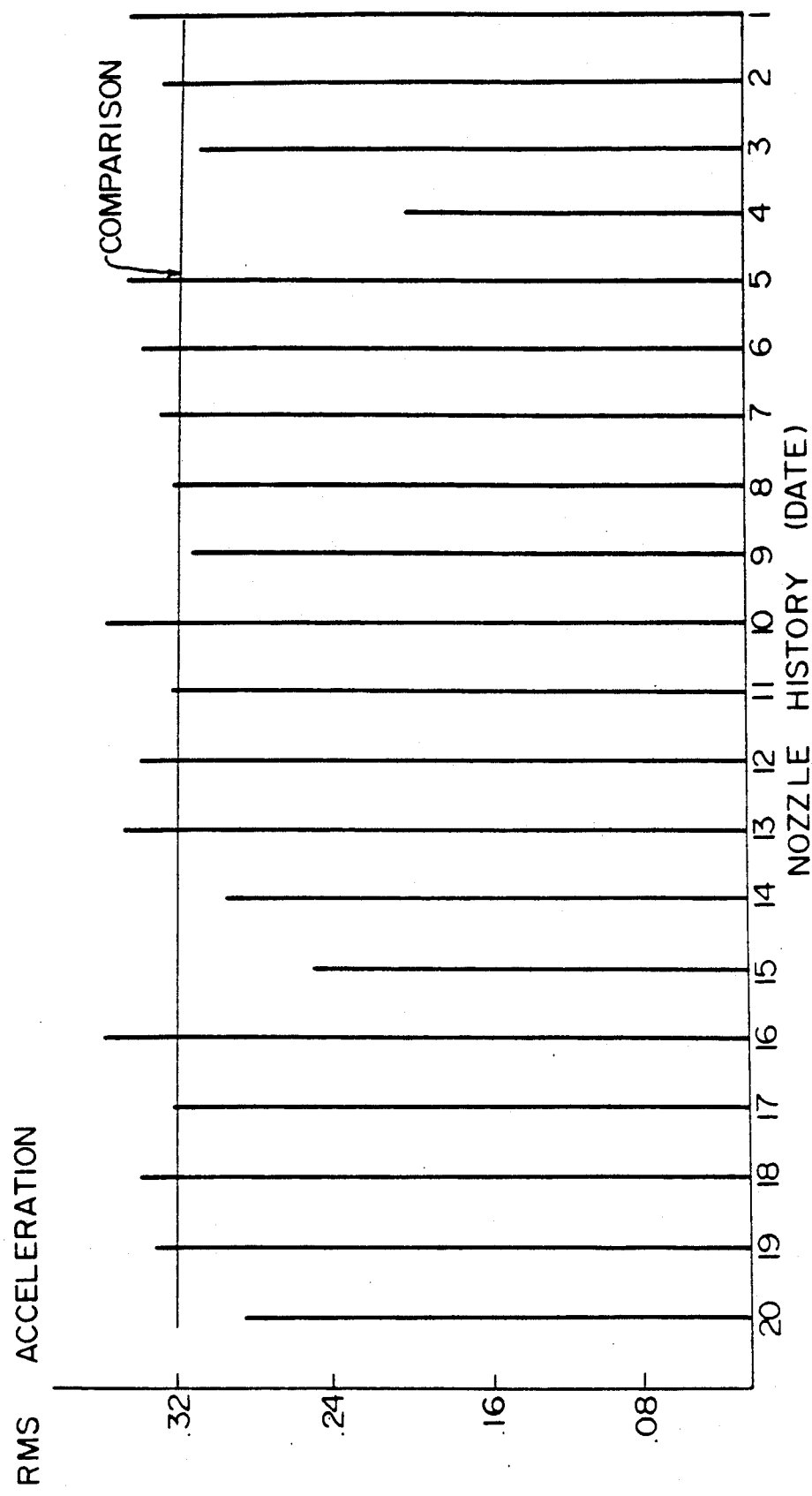

ALL SUBSEQUENT CALCULATIONS ON UNSMOOTHED DATA.

IF AREA ON ONE PEAK IS SUFFICIENTLY GREATER THAN OTHER PEAK ONLY ONE PEAK FOUND

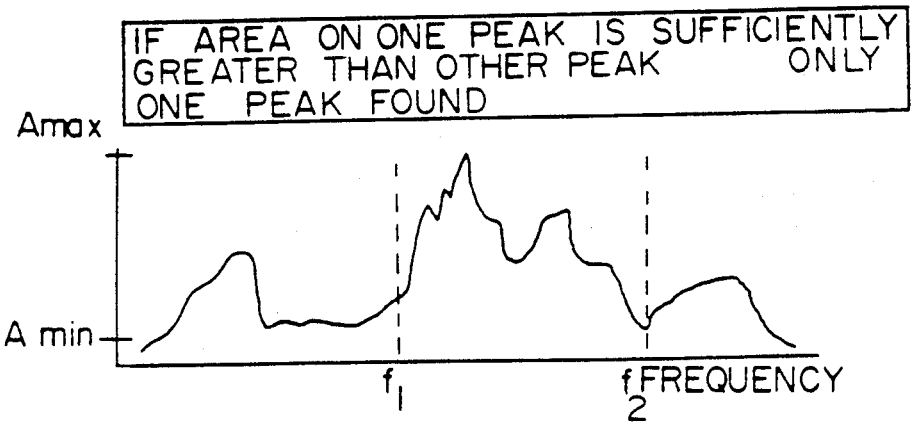

SYSTEM IDENTIFIES FREQUENCY BAND BETWEEN $f_1$ AND $f_2$ AS MEETING THE PRE-ESTABLISHED CRITERIA:

min BANDWIDTH $\leq f_1 - f_2$ max $\leq$ BANDWIDTH
min Amp RATIO $\leq$ Amax/Amin $\leq$ max Amp RATIO IF TWO PEAKS ABOUT EQUAL USE AVERAGE AREA ALTHOUGH IN SOME CASES NO PEAK FREQUENCY MAY BE FOUND

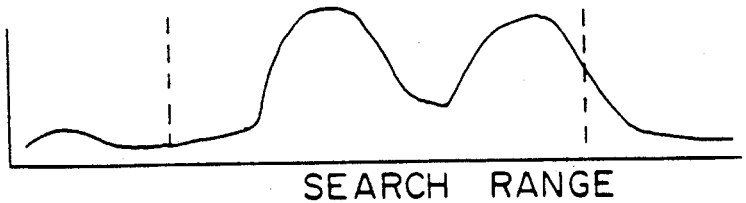

SEARCH RANGE

FIG. 12B

PASSIVE ACOUSTICS SYSTEM TO MONITOR FLUIDIZED BED SYSTEMS

BACKGROUND OF THE INVENTION

A fluidized bed is a suspension of solid particles in a stream of gas or liquid of sufficient velocity to support the particle by flow forces against the downward force of gravity. Fluidized beds are critical components of important petrochemical processing units such as the catalytic cracking ("cat-cracking") of petroleum on catalytic particles to produce lighter and more valuable products as well as thermal cracking of heavy feeds on coke particles ("fluid bed cokers" or "flexi-cokers") to again produce lighter and more valuable feeds. In cat-cracking the regenerator where coke is burned off the catalyst to produce "fresh catalyst" contains a fluidized bed. The particles in the fluidized bed within the regenerator are approximately 60 micron diameter pellets of a zeolite. In the case of fluid bed or flexi-coking, fluidized beds can be found in the heater, reactor and in the case of flexi-coking, the gasifier. The particles in this case are approximately 100 to 150 micron particles of coke.

Other fluidized beds containing small solids suspended in a gas include advanced coal combustion units where small particles of coal are suspended and burned to produce heat with minimum pollution and maximum efficiency. Yet another example is found in separation processes in the chemical industry where a fine suspension of particles is suspended in a flowing liquid. In general, fluidized beds are used in many large scale processes where it is desired to maximize the interaction between the surface of a particle and a surrounding gas or liquid.

Fluidized beds can contain volume mass densities for the case of fluid bed cokers and regenerators of the order of 40 pounds per cubic foot and particle velocities of several feet per second. Fluidized beds of the order of 10 to 50 feet in diameter are found in coking and cat cracking. With bed heights of the order of 10 to 60 feet, the contained fluids range from less than a hundred to more than a thousand tons of particles.

It is desirable to be able to directly measure the characteristics of fluidized bed reactors. Such characteristics include bed level location, transfer line operation, feed-injector operation, flow uniformity through the bed, uniformity as a function of time, and, for cokers, wall-coke thickness as coke builds up on the interior wall of the unit.

BRIEF SUMMARY OF THE INVENTION

The present invention is a system for translating the acoustic/vibratory energy of the fluidized bed system into a power spectrum as a function of frequency for determining the performance characteristics of the unit.

The system includes:
sensors for transforming vibratory energy of the reactor into electrical signals as a function of time;
an amplifier to increase the level of the generated electrical signals;
data collector for converting to electrical signals from a function of time to a function of frequency;
a computer, and a means to transfer the electrical signals from the data collector to the computer in which the electrical signals are algorithmically converted to process related information.

In a preferred embodiment, the data signals are transferred electrically to the computer.

BRIEF DESCRIPTION OF THE DRAWINGS

FIG. 9A, FIG. 9B and FIG. 9C show how the system displays the data obtained for feed injectors.

DESCRIPTION OF THE PREFERRED EMBODIMENT

Figure 1:
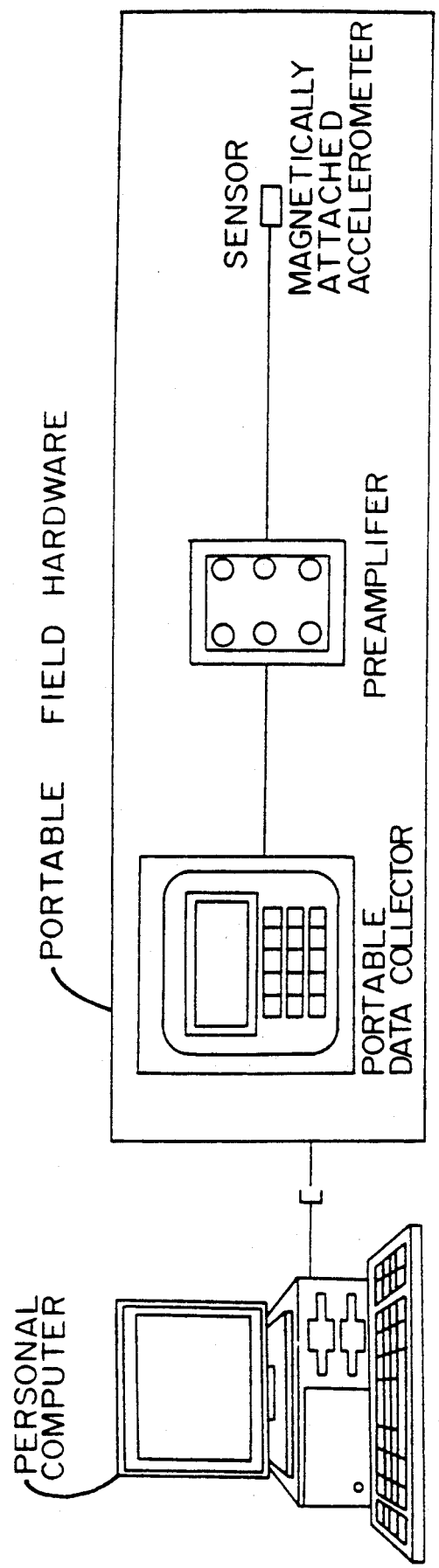
FIG. 1 shows a schematic drawing of the system of the present invention.

The system of the present invention is shown schematically in FIG. 1. The system translates the acoustic/vibratory energy created by industrial processes into useful process-related information. Data are typically measured using commercially available transducers (accelerometer, pressure, etc.). The preamplifier provides the necessary signal conditioning between the accelerometer and data collector. The commercially available data collector performs the necessary frequency domain averaging and temporary data storage. The data are ultimately loaded to a computer for analysis and archival storage. For fluidized bed units, examples are provided demonstrating how the system can provide information on vessel flow uniformity, fluid bed height, mixing uniformity, quality of feed nozzle operation, nozzle steam/feed mixing, and wall coke buildup. This invention enables a non-acoustical expert to easily collect and interpret data.

The acoustic/vibratory portable analysis system consists of the following components: (1) sensors; (2) a preamplifier; (3) a commercially available data collector; (4) specialized software to translate the vibratory/acoustic data into process related information; and (5) (optional) commercial or customized software to transfer data between the data collector and computer. In normal usage, an operator would perform the data collection and analysis as follows:

a. (optional-data collector dependent): Load route information from the computer to the data collector.
b. Collect field data.
c. Unload field data from collector to computer.
d. Run computer program to analyze collected data. The operator can select between an automated or manual analysis mode.
e. Interpret analyzed data.

Output from the system can be tabular and/or graphical. Depending on the application, results are interpreted on an: absolute basis; relative basis utilizing only the current data; relative basis comparing the current data with previously collected (historical) data.

The system distinguishes two kinds of historical data. Routine data are collected with no prejudice regarding process conditions. Special comparison data are collected when the process is in a particular condition (typically immediately after start-up with no known operating problems). A diagnostic data type (non-historical) is also available for conducting "spot checks".

An important feature of the system is its capability to manipulate acoustical power spectra: peak finding and area calculation. The system's functionality enables a user to modify existing procedures or add new applications in software. Extensive computer expertise is not required to implement such changes.

The peak finding and area calculation algorithms are based on algorithms developed for vibrational analysis applications. A stack oriented calculator is built into the algorithm to facilitate tuning to specific applications. This feature enables extracted power spectra quantities (area, peak amplitude, peak frequency, band width) to be manipulated arithmetically.

A "learn" mode option allows a user to try out various procedures. A shell is built into the system that allows the user full access to such utilities as copy, rename, delete, and other system operations. A full screen editor lets the user merge and edit existing procedures or replicate and customize procedure templates.

Field data from various data collectors are converted to a standard format via independent "plug-compatible" data conversion modules. Historical data results are stored in a spreadsheet format that may be used directly or imported easily by commercially available spreadsheet or database programs. In general, the system is designed to be a completely self-contained unit for the analysis and reporting of vibrational analysis data that can accept data from various data collectors and can act as the "front-end" to other analysis packages.

The hardware used in the system of the present invention is described below. However, there are many equivalent acceptable substitutes supplied by many vendors. The accelerometers used in the system include B&K 4384 or Endevco 2276. The preamplifier is B&K 2634 or B&K 2635. The portable data collector is a Palomar 6100, Ono Sokki CF200, or Ono Sokki CF350. The personal computer may be a IBM PC/AT, IBM PC/PS2 Model 60, 70 or 80, or compatible unit.

The commercially available software that is used to operate the present system is ASYST (Version 2.1) and ENTEK Monitor (Version 2.83) (transferring data from data collector to personal computer).

The system shell is built using ASYST. The major analysis features are subsequently described.

The system can be used in the manual mode by applications personnel for non-routine analysis and research purposes. Once applications have been developed, the system can be used in an automatic mode by operations personnel. For example, current fluidized bed systems automated applications include:
1. Monitor feed-injector operation
2. Assess reactor-flow uniformity
3. Estimate wall-coke thickness
4. Approximate bed-level location.

OVERVIEW OF MAJOR STEPS TO USE SYSTEM

1. Download the route information from the computer into the data collector. Optional (dependent upon data collector):
2. Collect the field data.
3. Upload the field data from the data collector to the computer.
4. Use the system software to analyze the data uploaded into the computer.

The concepts, measurement techniques and analysis procedures on which the system of the present invention is based will now be described.

DATA CAPTURE

The system captures vibration data by attaching (magnetically, adhesive, screws, etc.) accelerometers to a vessel wall or to the external piping of a feed injection nozzle. An accelerometer transforms vibration data into electrical signals. The specified accelerometer only measures vibrational energy perpendicular to its face; the types identified do not respond to vibrations parallel to its surface. Data are collected for about two minutes so that the signal can be averaged in order to minimize the impact of data extremes which don't represent true process parameters. Depending on the application, 20-100 ensemble frequency domain averages are sufficient to ensure sufficient statistical accuracy.

It is important that the surface be clean at the measuring location. The surface must be free of dirt, rust, and paint. The points should be cleaned immediately prior to each set of measurements. The points should not be close to mechanical discontinuities such as welds.

To enhance data repeatability, it is recommended that all measuring locations be clearly marked and labelled on the vessel wall with high temperature paint. The numbering scheme should be logical and consistent, providing a unique identifier for each point. These identifiers are optionally programmed into the data collector to assist the operator in collecting data. More details on naming conventions are provided in the software section.

DATA TRANSLATION

By amplifying the small electrical signal from the accelerometer to a level suitable for use by the data collector, the preamplifier assures electrical compatibility between the accelerometer and data collector. While some signals from the accelerometer are strong enough to drive the data collector without a preamplifier it can not be assured that signals at all frequencies will be treated equivalently.

Current vibrational analysis technology uses the frequency components of the vibration signals to translate the vibration signals into meaningful process information. It is the FFT signal processor in the data collector hardware which enables the vibration signals to be analyzed as a function of frequency.

Figure 2:
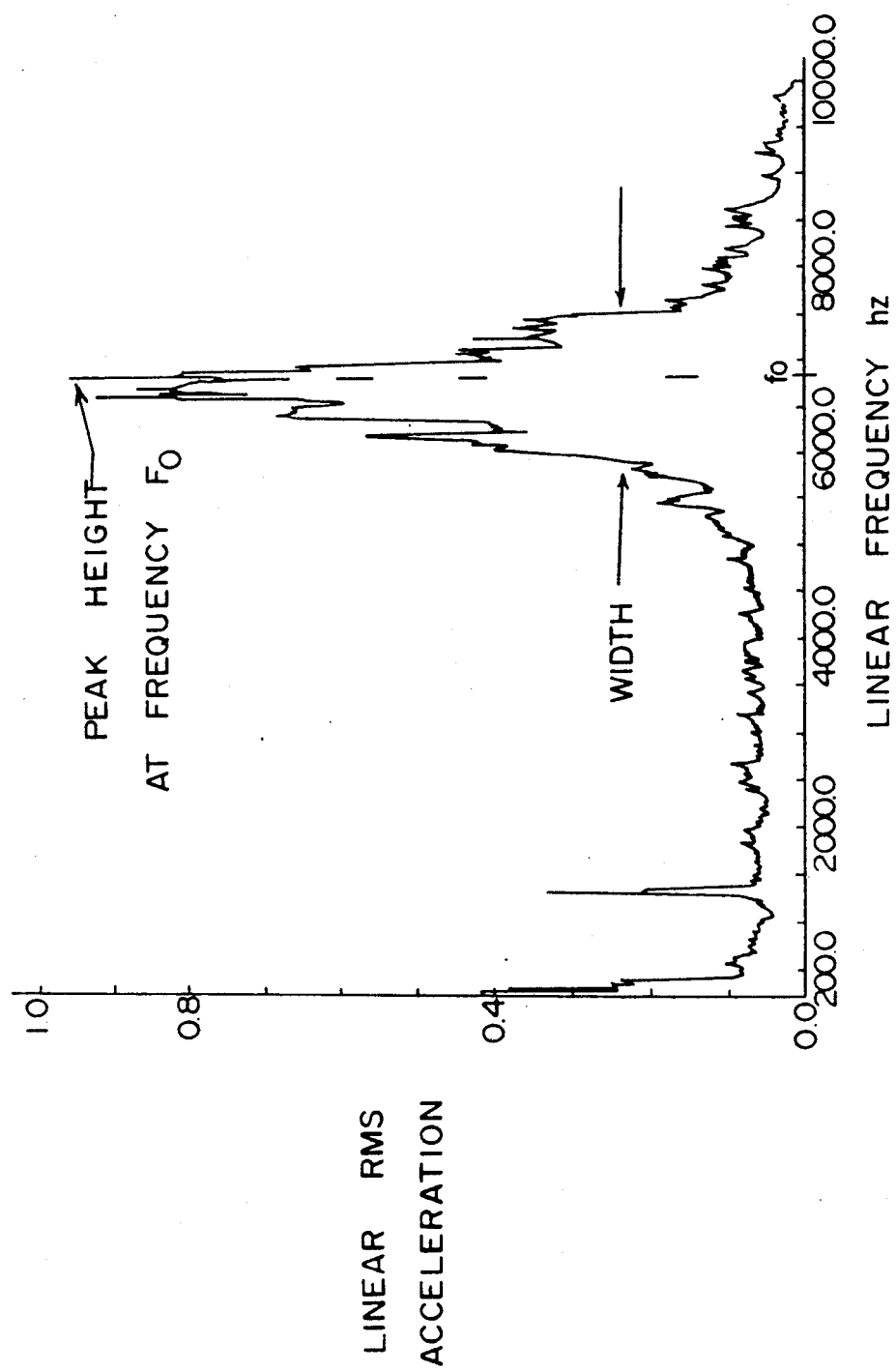
FIG. 2 shows a typical wall signal spectrum that can be processed by the system.

A fluidized bed reactor system generates vibration signals over a large frequency band, with each vessel and pipe amplifying some frequencies and attenuating others. For example, the thickness and composition of the reactor vessel wall causes a natural acoustical resonance (amplification) in the 5000-10,000 Hz range (FIG. 2). Certain applications (e.g. reactor bed level, wall coke thickness) typically make use of only the signals within this resonance band. The signal characteristics of particular interest to the system are: 1) the frequency at which the resonance occurs and 2) the acceleration within the frequency limits defined by the resonance band (i.e. the band-limited acceleration). The band-limited acceleration is proportional to the area under the resonance peak.

HISTORICAL DATA

The fundamental basis of this vibrational analysis system is that a refining process—without the assistance of an external noise source—will generate vibrational energy which can be received at the surface of the process vessel or feed injector. One objective of the technology is to develop a "dictionary" that will help the process engineer interpret the meaning of these signals. This system facilitates the development of the dictionary.

For all applications the historical data base is important. Consequently, the best operating mode includes a complete set of reference (comparison) data which are collected when the unit is in an operating state with no know problems. Data collected shortly after a unit start-up would typically meet this criterion. Accordingly, the system specifically accommodates base-case data (denoted herein as comparison data) but does not require it.

EXAMPLES FLUID COKER/FLEXICOKING WALL MEASUREMENTS

FIG. 2 illustrates a typical wall signal as "heard" by the system. For the wall signal, the band-limited acceleration (area under the peak, usually called the wall resonance acceleration) can help evaluate both flow uniformity and bed level. The measurement of wall coke thickness is based on the frequency associated with the peak amplitude of the wall resonance rather than the actual acceleration level. These examples are described in this section.

Using wall resonance acceleration tends to minimize the impact of other extraneous mechanical resonances from the vessel structure. However, wall-resonance acceleration data can be contaminated or obscured by localized mechanical discontinuities, e.g. weld plates, mechanical supports, refractory ties. Therefore, if data from a particular measurement location is significantly different from other data within the measurement series, the specific mechanical structure around that location should be reviewed.

1. Flow Uniformity

The system provides a means for evaluating flow uniformity within a vessel. In actuality, since conditions of nonuniformity are of more concern to operating personnel, this application is often referred to as flow anisotropy evaluation.

Current technology relates the wall resonance acceleration to coke or catalyst particles striking the vessel wall. The acceleration increases for: more particles striking the wall; particles with higher velocity; or particles with greater mass.

Figure 3:
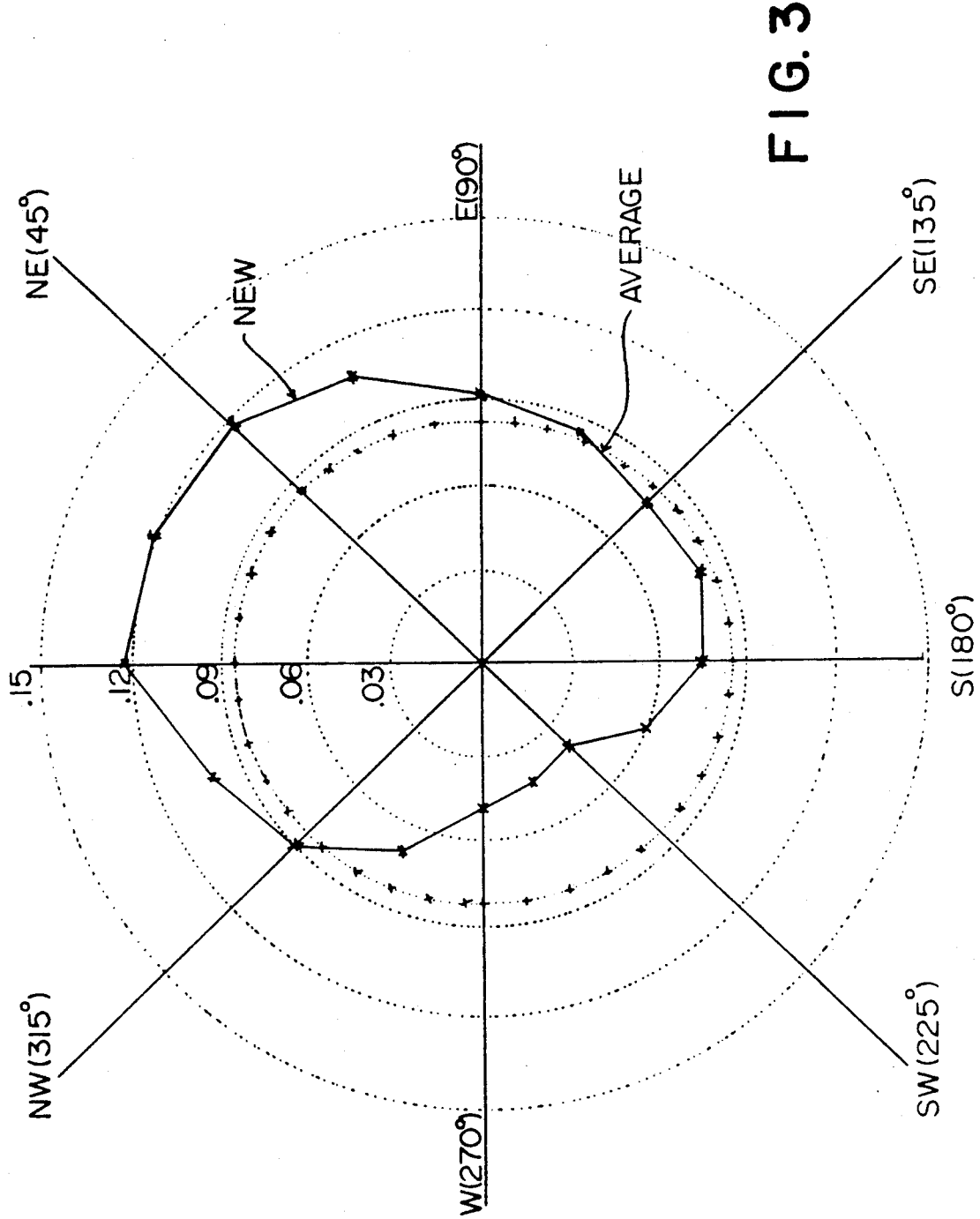
FIG. 3 shows a typical anisotropy plot that can be generated by the system.

Flow anisotropy is evaluated by conducting wall measurements circumferentially at a vessel cross-section. Typically 8-20 measurement locations are used at each cross-section depending on vessel size. As a rule, the point to point circumferential distance should be limited to approximately 2 meters (6 feet). The number and location of cross-sections are unit dependent, but some typical locations include:

a. several cross-sections in the stripper section above the injection spargers
b. 0.5-1 meter above the grid
c. above and below the reactor stripper nozzles
d. midway between the grid and the top of the dense phase
e. at the top of the dense phase
f. in the dilute phase
g. strategic transfer line locations FIG. 3 shows on a polar graph the result of an anisotropy measurement on a coker wall. The wall resonance accelerations were computed and plotted on FIG. 3 at the correct angular position for 8 positions (measurement locations). The dotted circle shows the average result of all eight positions. The average is presented as a guide for the eye to evaluate deviations from the average. It can be shown that the acceleration signals are proportional to the product of the coke particles' volume density and velocity to the 3/2 power. Guidelines, presented below, enable process-related information to be inferred from these data.

Figure 4:
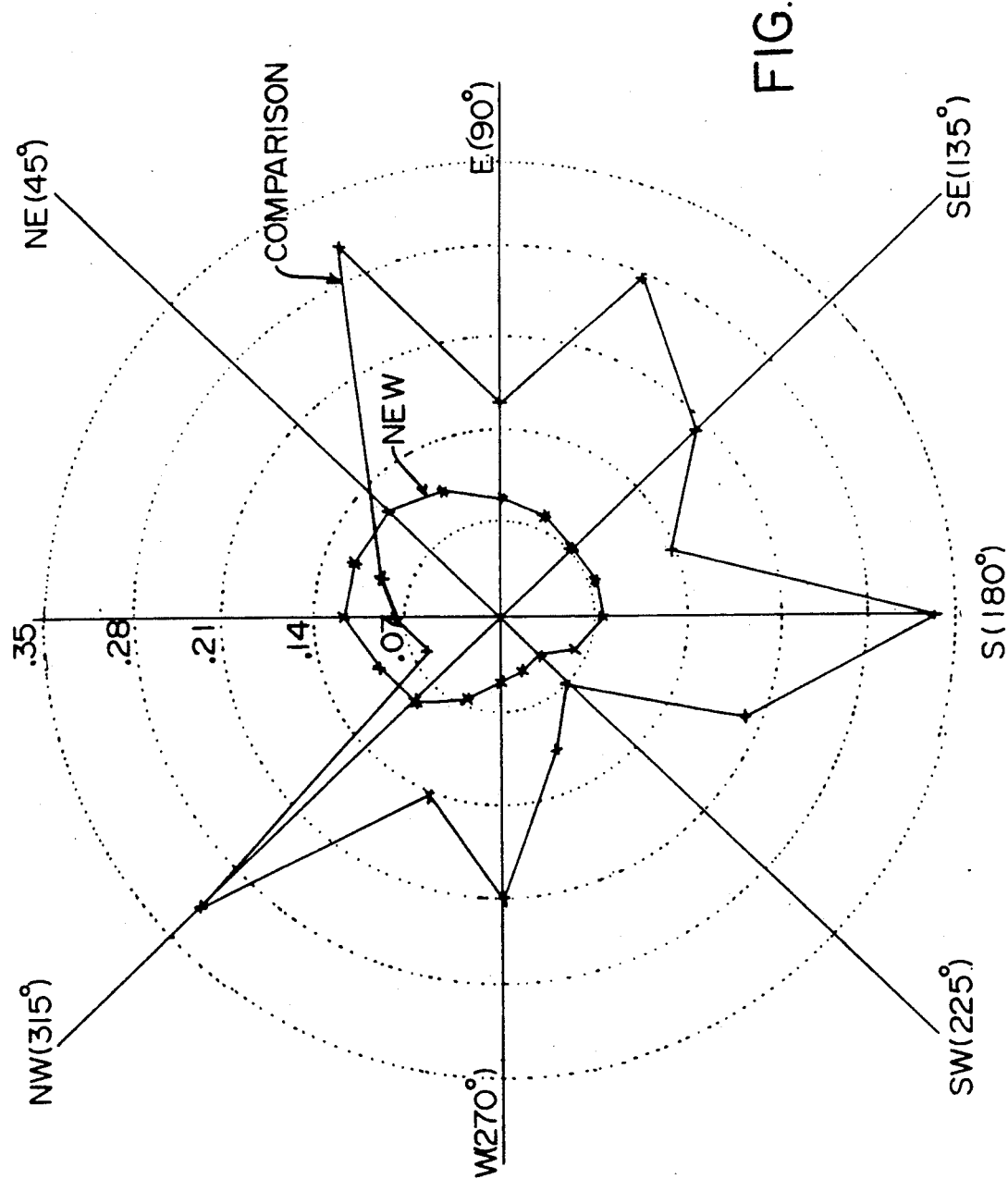
FIG. 4 shows how the system presents a typical anisotropy plot with comparison data.

The system generates the type of plot shown in FIG. 3. To further assist in the analysis, the system enables overlay of the current circumferential data with previous data. FIG. 4 shows the use of overlayed data in evaluating a FCCU regenerator grid malfunction. The system provides this overlay capability to compare the current unit performance with the comparison data set (FIG. 4). Flow patterns which deviate substantially from historical (e.g., comparison) data warrant further investigation.

As stated previously, unit historical data provide the best evaluation tool. However, in the absence of historical data some general statistical guidelines may be developed for identifying abnormal operating conditions. A procedure for developing these guidelines is to collect repeated data on a normally operating unit or data on several similar units.

2. Wall Coke Thickness

Since the data used to evaluate flow anisotropy also are used to measure wall-coke thickness, the system can identify wall coke thickness at each measured circumferential cross-section. The guidelines for measurement spacing and cross-section location are identical with those presented for anisotropy measurements.

The way data are analyzed for wall coke thickness and anisotropy, however, do differ. Rather than using the actual acceleration level, wall coke thickness is calculated according to the following formula:

$$\text{Thickness} = \frac{A}{\text{resonance frequency}} + B + C$$

where:
thickness = coke thickness (excluding steel, refractory)
resonance frequency = wall resonance (Hz)
constants A, B: theoretical constants dependent upon: steel/refractory thickness, sound speeds, densities.
constant C: empirical constant dependent upon refractory type and contact to wall. This constant can be determined when the vessel has been cleaned after unit turnaround. The measurement should be reconfirmed after each turnaround.

Figure 5:
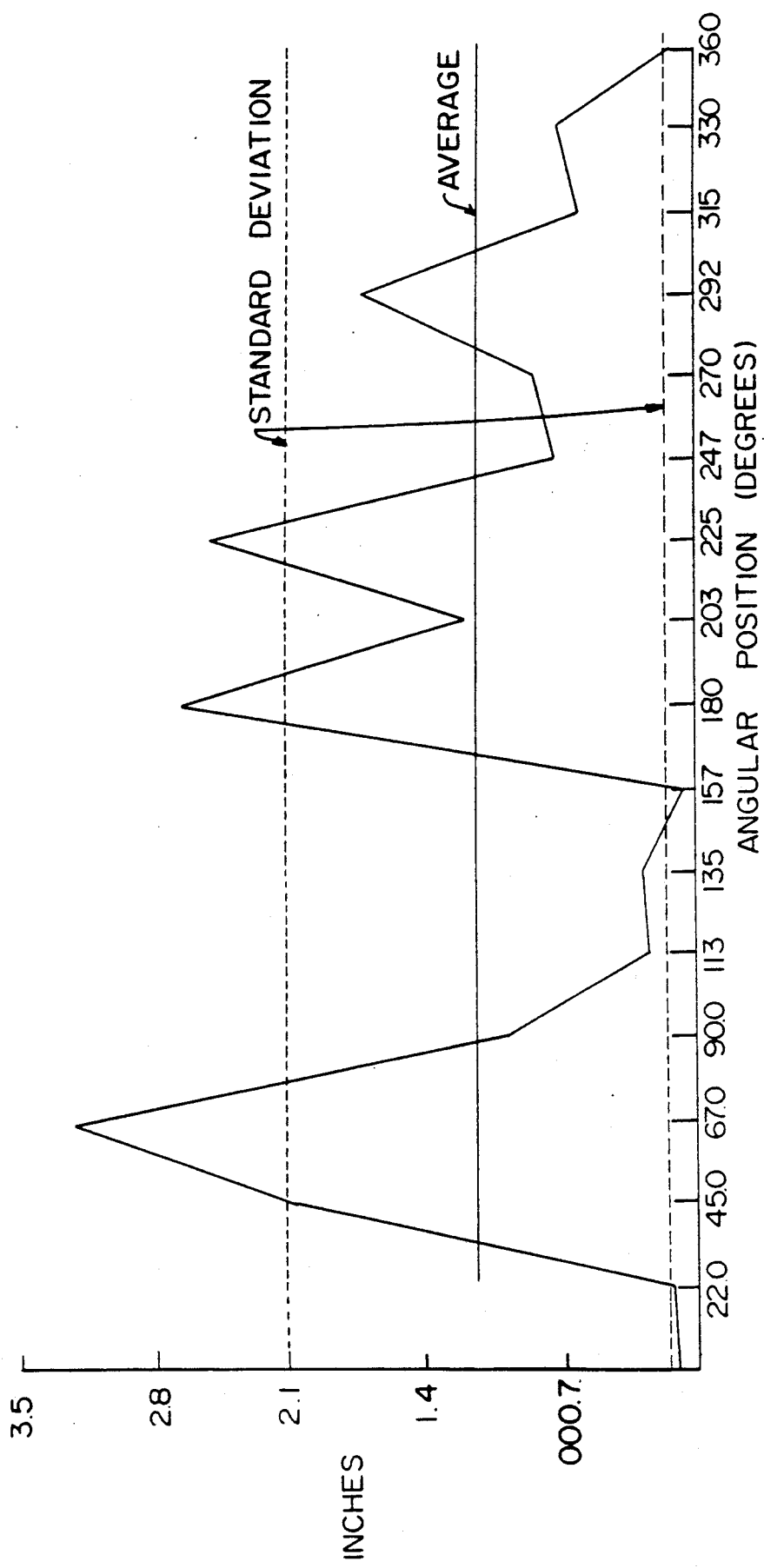
FIG. 5 shows how the system presents data for wall thickness.
Figure 6:
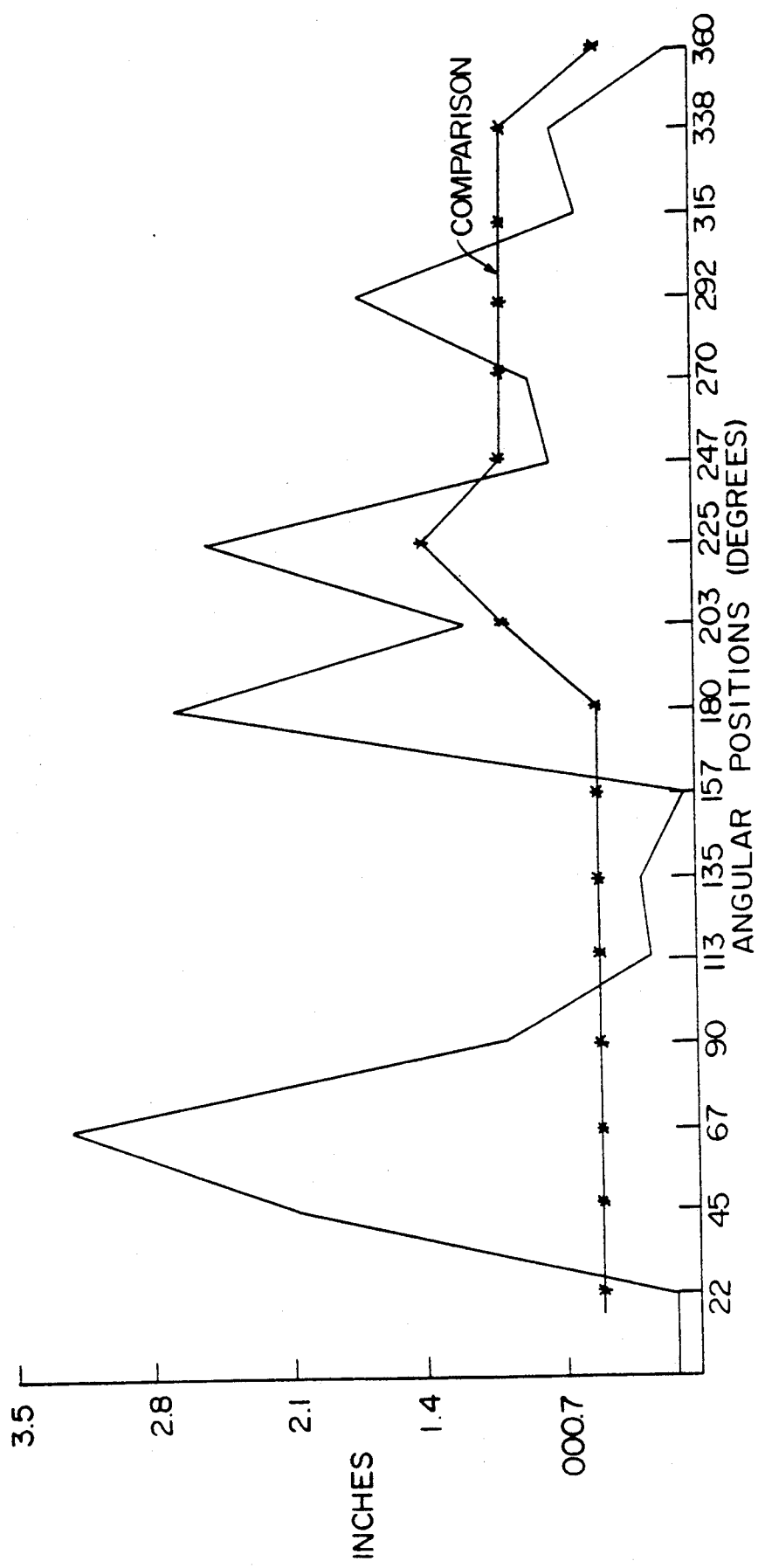
FIG. 6 shows how the system presents data for wall thickness with comparison data.

The system identifies the resonance frequency, performs the above calculation, and presents coke thickness as a function of position graphically, as shown in FIG. 5. Where necessary, the calculation procedure accounts for differences in steel and refractory differences by deck. As in the case of flow anisotropy, the point-by-point coke thickness in inches or centimeters is compared with the average coke thickness. Comparison of current coke thickness data with historical data also is possible (FIG. 6).

3. Bed Level

Bed-level identification and analysis procedures are virtually identical to flow anisotropy, except the measurements are conducted vertically rather than horizontally.

The procedure for locating bed level is to conduct several measurements vertically on the heater wall. Typically 15-20 measurement positions are required with 6-8 inch spacing, in order to encompass the nominal bed level. Approximately half the points should be below the estimated bed level and half above. Although measurements in a single quadrant are sufficient to determine bed level, repeated tests in other quadrants will account for the effects of vessel anisotropy. Testing in more than one quadrant is recommended.

Bed level measurements are very susceptible to contamination by small process changes. The present system can determine whether or not the changes will adversely affect the bed level determination. One point in each quadrant, designated as the reference bed level measurement location, is used to confirm steady process conditions during the test period. Measurements at the reference point are conducted at the start and conclusion of the test. This reference location is the bottom most location within each quadrant. The system compares the starting and ending data to confirm process stability over the measurement period.

Figure 7A:
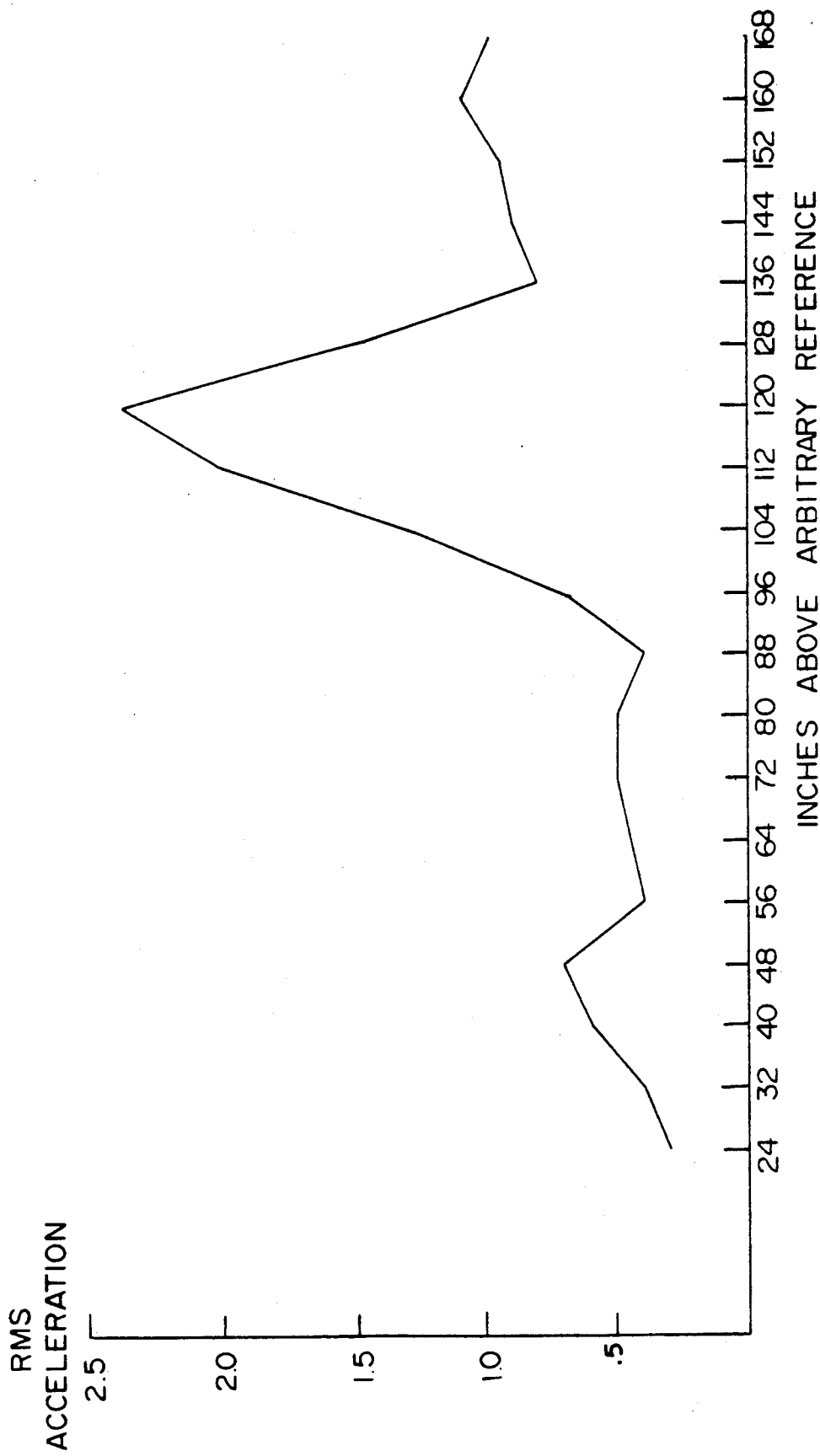
FIG. 7A and FIG. 7B shows how the system presents data for bed level determinations.
Figure 7B:
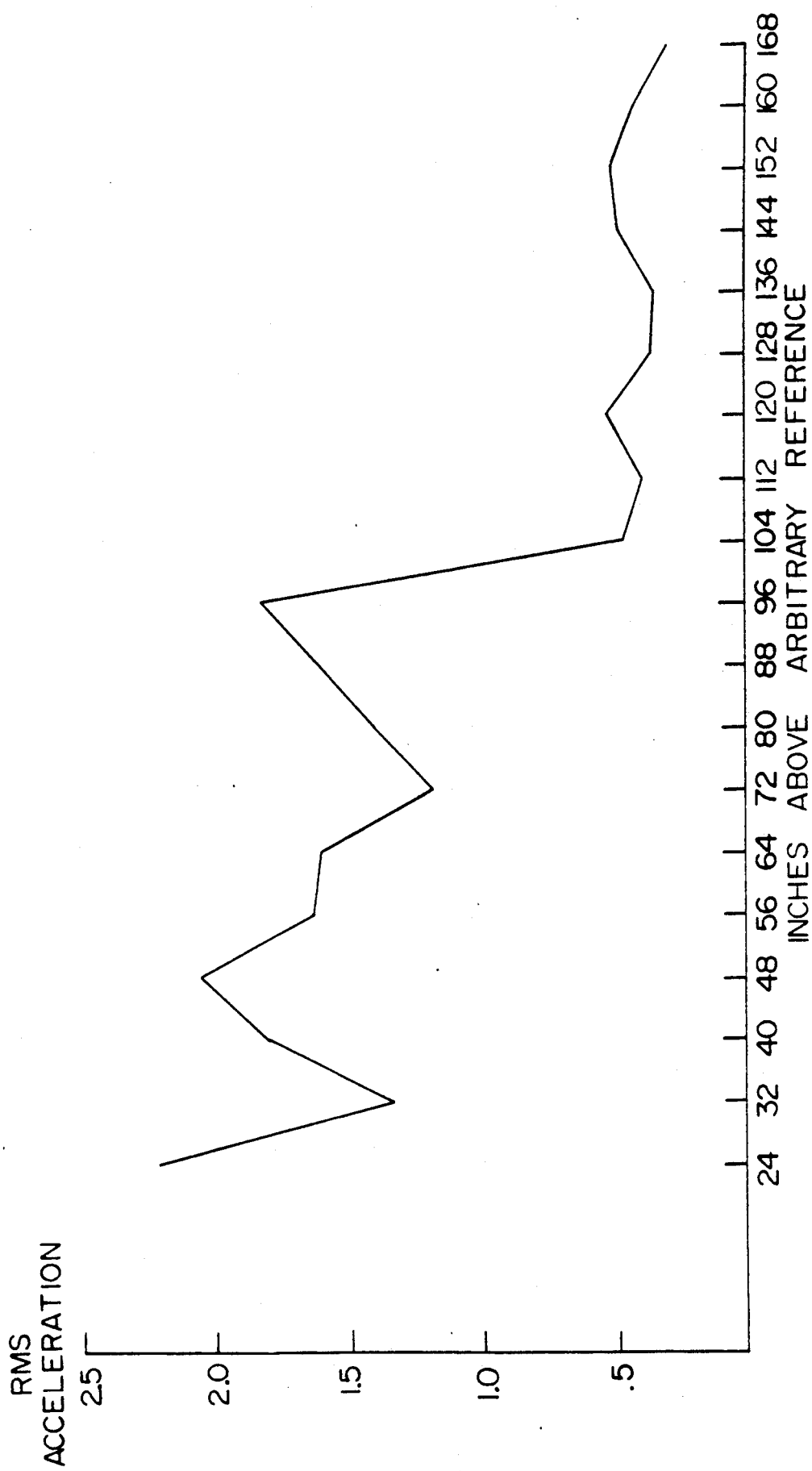

The system will compute the wall resonance acceleration at each location and present the data as shown in FIGS. 7A-B. For bed level determination, relative acceleration values are more important than actual acceleration.

Current vibrational analysis technology interprets the sharp consistent drop in signal level as the separator between the dense and dilute phases. Although the FIG. 7 examples show different curve shapes, they are all characterized by a steep signal drop. It has been observed that this acceleration drop accurately tracks changes in bed level. However, there may be a unit-dependent offset between this characteristic and actual bed level. Typically, this offset may be within 0-0.5 m (0-1.5 feet). The system presents data graphically but leaves the final interpretation to the operator. In essence, the operator must calibrate a vessel to the signal by evaluating the offset between the nominal bed level (calculated by pressure and density measurements) and the top of the transition region. Of course, this calibration should be done at a time when bed level can be reliably determined with pressure and density data.

The theoretical concepts that relate bed level to the signal rely on bed activity. Fluid bed models suggest that maximum bed activity (e.g. bubbles bursting) occurs at the top of the dense bed. Above this bubble breaking region, the number of particles per unit volume decreases rapidly. Current analysis suggests that the system can identify the region where the number of particles and particle velocity decreases.

EXAMPLE OF USE: FLUID COKE FLEXICOKING FEED INJECTORS

Currently, the system relies on identifying a mechanical or fluid resonance. As previously explained, the frequency of the wall resonance depends upon the wall geometry and amplitude depends on process conditions. The situation is slightly different for feed injectors. The discussion which follows only applies to straight-through coker or flexicoker feed injectors and is not directly applicable for FCCU straight-through, fan, or Bete feed injectors.

Figure 8A:
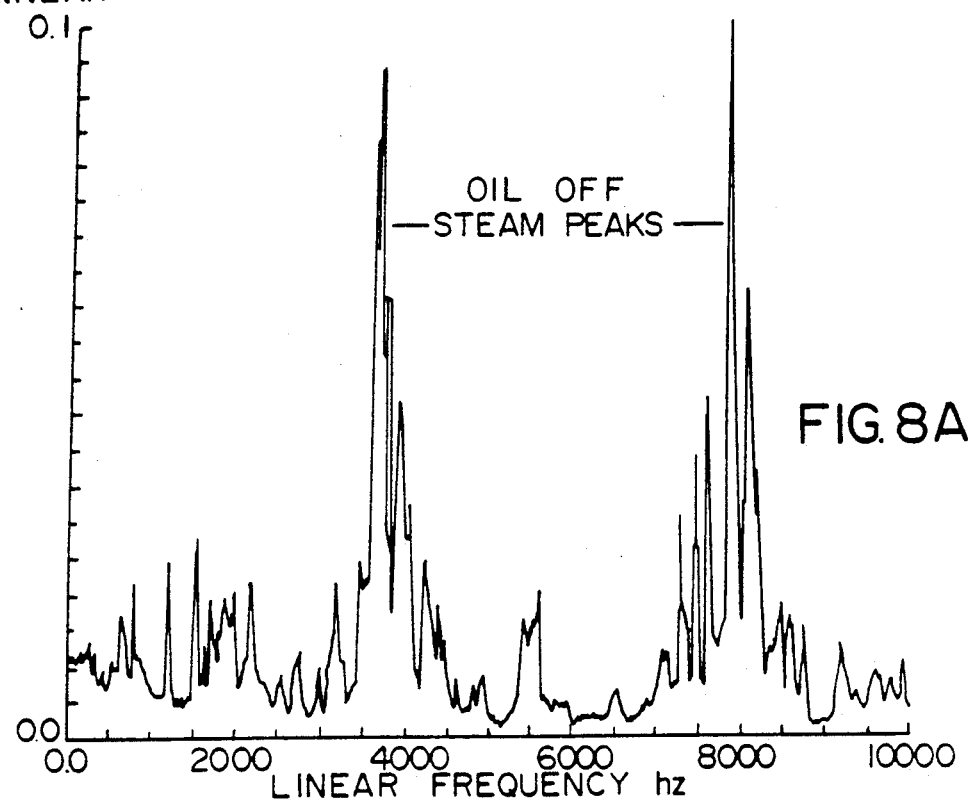
FIG. 8 shows the power spectrum for feed injectors.
Figure 8B:
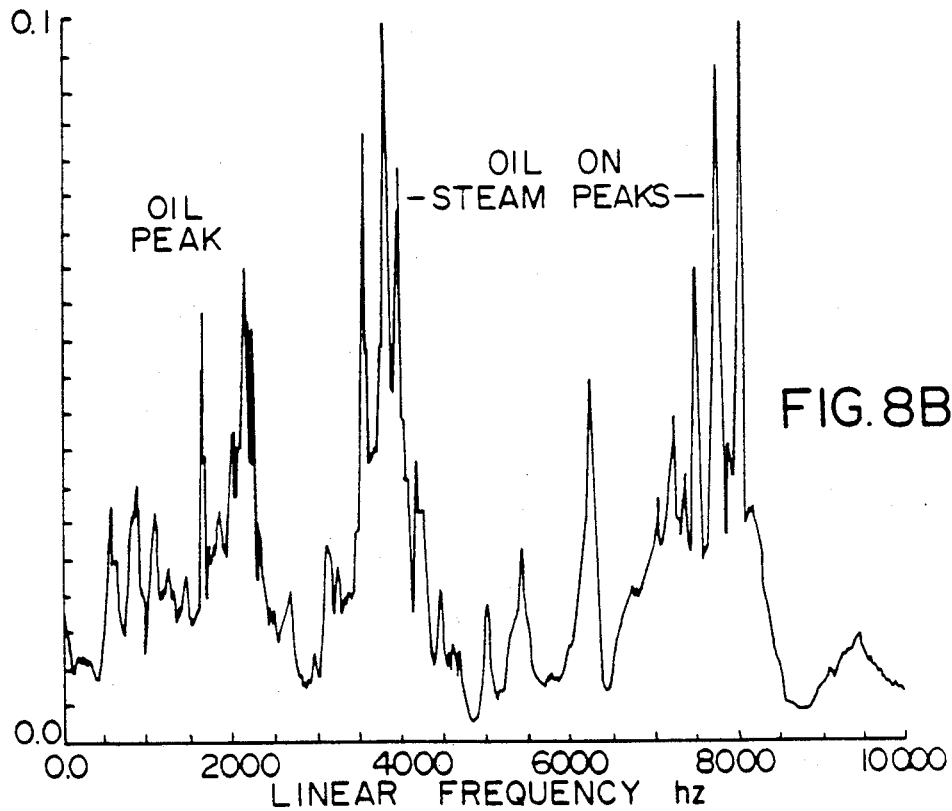

For coker (also flexicoker) feed injectors, experience shows that part of the signal spectrum can be associated with oil flow and part with injector steam flow. FIGS. 8A and 8B demonstrate an example from an injector on a Flexicoker (the measurement location is the injector rodding plug). The data in FIG. 8A were collected during a condition of steam flow only (e.g. "off" injector), and the FIG. 8B data were measured during oil and steam flow (e.g. "on" injector). The primary feature to note is the signal increase around 2000 Hz when the oil is turned on. For coker-feed injectors, the oil signal always occurs lower in frequency than the steam flow signal. The oil signal frequency is determined by nozzle size and piping geometry. In contrast, the steam signal frequency is set by the steam restriction orifice size which has a much smaller diameter than the characteristic dimension of the nozzle. The system is first used to identify, establish, and verify the kind of relationship demonstrated in FIGS. 8A and 8B. Typically, this analysis would be done in the manual mode by an application engineer. Once the application is proven and verified, the system can be programmed in the automated mode to compute tables and graphs.

While the frequency range for the oil and steam signals are different for different units, it is reasonably repeatable for feed injectors within a specific unit. For the tested cases, the oil signal frequency has been between 700-2000 Hz. The frequency ranges are functions of feed injector geometry, external injector plumbing, process conditions (steam and oil flow), and feed type. Therefore, the only reliable method for identifying steam and oil signals is to conduct an injector by injector on/off (oil) test.

Analogous to the wall resonance, the current technology relates the band-limited acceleration of the oil and steam signals to oil and steam flow, respectively. It is known that the two signals are not independent, i.e. changing either steam or oil flow will affect both signal components.

For typical oil and steam rates, however, the oil signal is comparatively less sensitive to steam fluctuations than it is to oil fluctuations. Therefore, under the assumption that injectors receive approximately the same steam flow, the oil signal can be used as a qualitative indicator of injector oil flow conditions. Although the oil signal is not directly proportional to oil flow, it does give an indication of oil/steam mixing and flow.

Likewise, assuming approximately equal nozzle-to-nozzle oil (liquid) flows, steam signals are a qualitative indicator of steam flow.

There are two basic analysis techniques for using oil and steam signals to track injector performance. Each depends upon the identification of signals outside the normal statistical distribution. One technique compares the current signal with historical data. The other technique compares the current injector signal with current data from other injectors. For "on" injectors, the oil, steam, and oil-to-steam ratio are the statistical parameters of interest. For "off" injectors, only the steam signal is followed.

Feed injectors are typically connected to a common header. In some feed systems, there may be subheaders defining closed feed rings, horseshoes, or dead ends. The vibrational analysis system enables historical and statistical data to be presented on a per nozzle or per subheader (ring) basis.

Figure 9B:
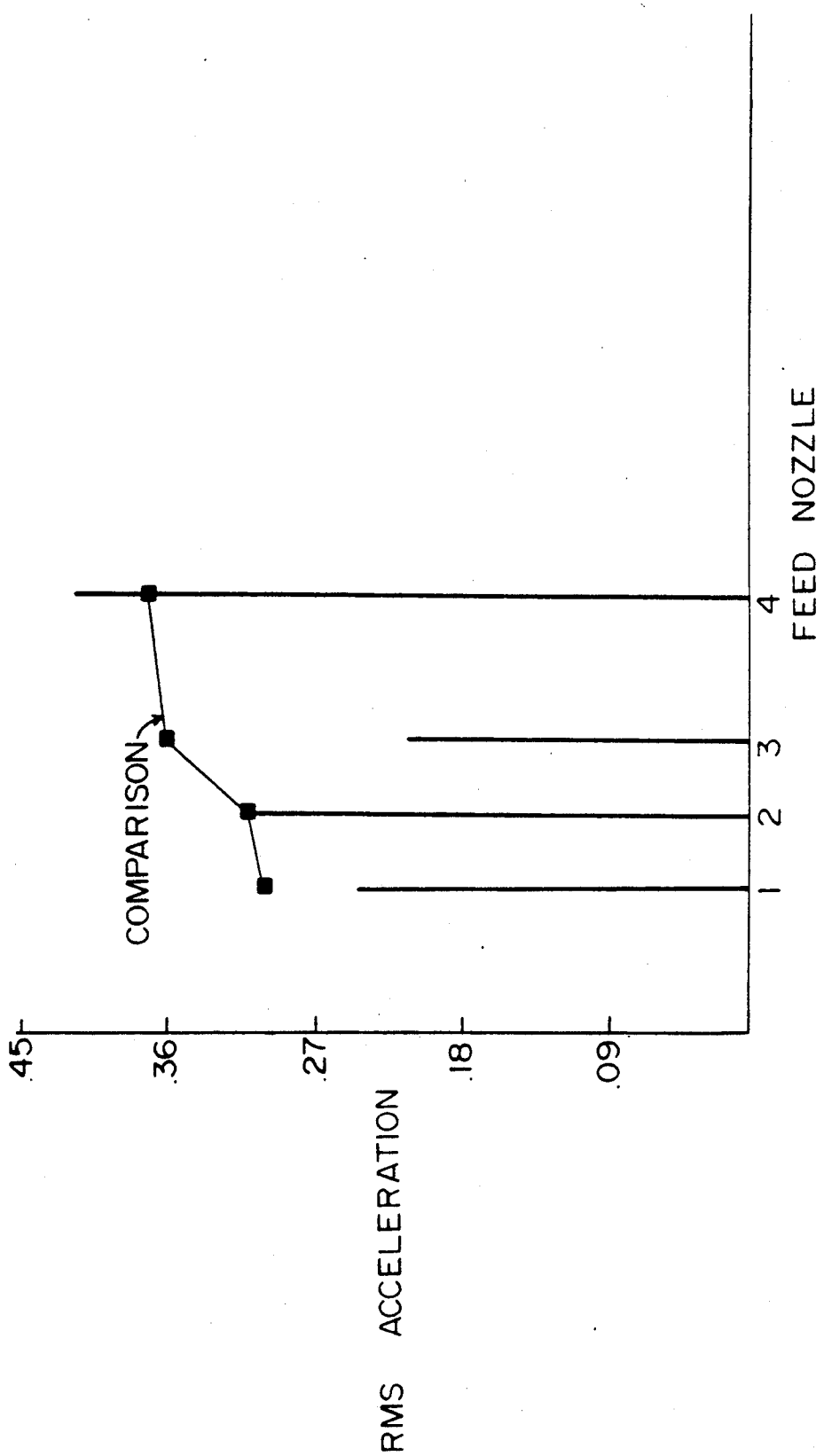
Figure 9C:
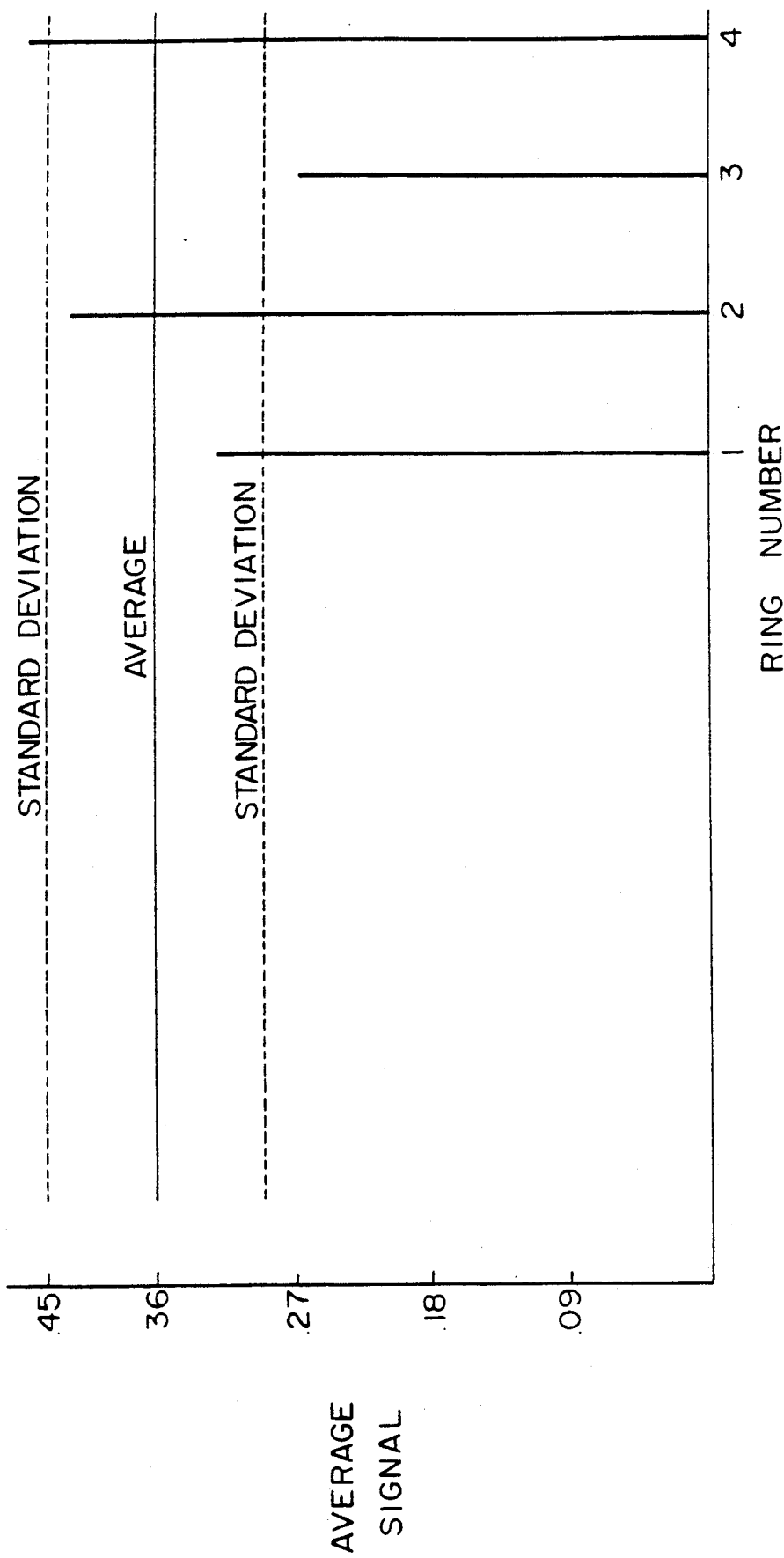

The system computes, tabulates, and graphs the above nozzle-related parameters. For example, FIG. 9A illustrates the "oil signal" data presentation for a particular nozzle. Provisions are included to overlay the comparison data when the nozzle was in a known, good operating condition. FIG. 9B illustrates how data are presented to facilitate comparison of nozzles on a given oil feed ring. FIG. 9C shows how the average "oil signal" data for all nozzles on a feed ring are compared. The system can also produce tabulated reports of the data shown in FIG. 9. In addition to computing "oil signal" information, similar presentations are also available for steam or chugging signals. The singular most important reporting feature is to present injector data in a manner that will facilitate the identification of statistical outliers.

Some general effect/cause guidelines include:
a. Significant decline in an injector's oil signal compared to historical or COMPARISON data: probable low oil flow.
b. Significant increase in an injector's oil signal when compared to historical or comparison data: possible chugging condition. In contrast, it is also possible that a blockage condition was removed. Note: on some injectors a separate chugging signal has been identified (lower frequency than the oil signal).
c. Significant decline in an injector's steam signal when compared to historical or comparison data: probable low steam condition.
d. Current injector steam or oil signal significantly lower than ring and unit average: probable low steam or oil flow to injector.
e. Injector-ring steam or oil signal average significantly lower than historical data: possible malfunction in steam or oil distribution to the ring.
f. Oil to steam ratio: provided as a summary means for identifying statistical outliers. A high oil/steam signal and low steam signal suggest low steam flow. The oil to steam ratio is also provided as an experimental parameter for future system revisions.

DESCRIPTION OF THE SOFTWARE

Figure 10:
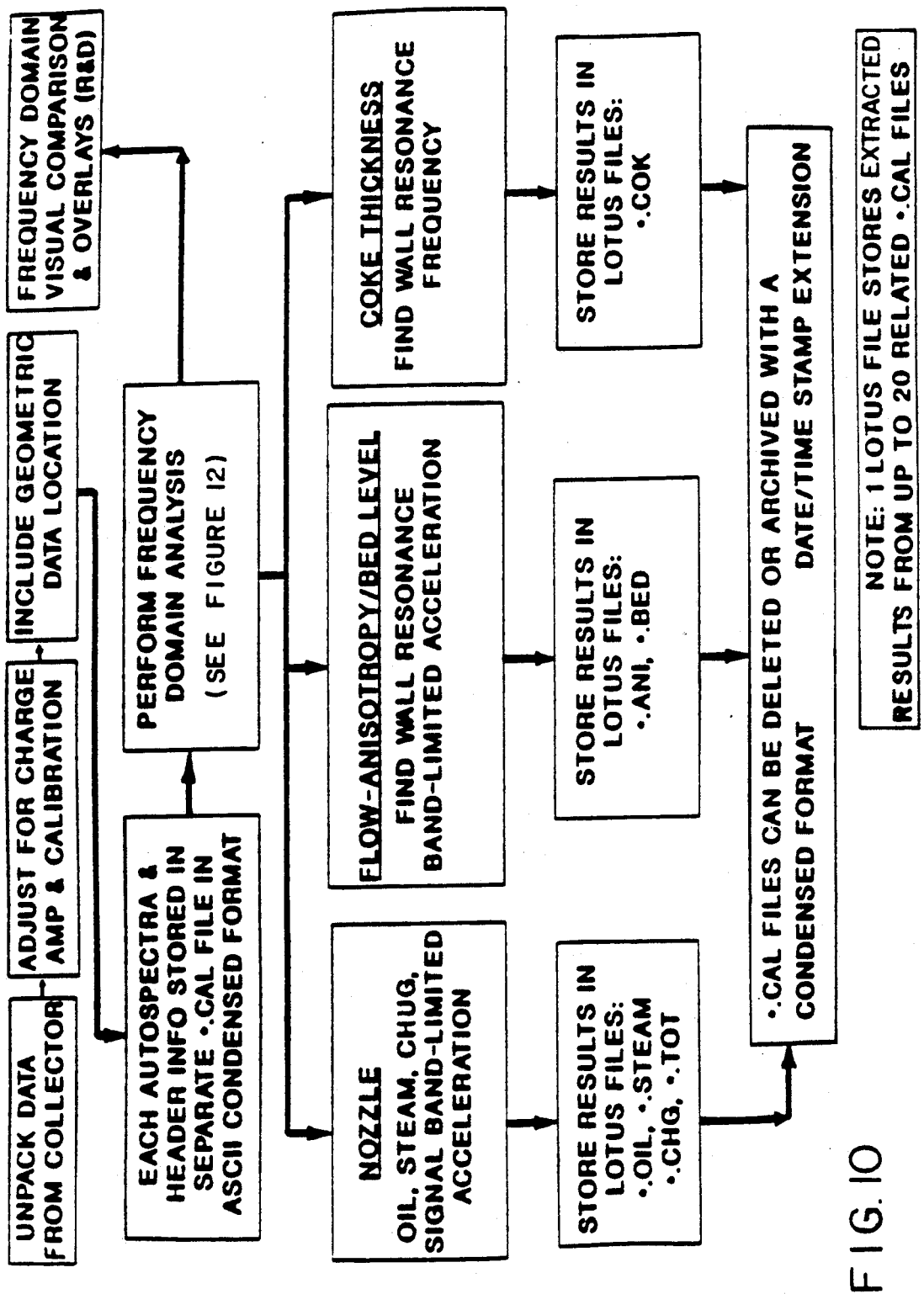
FIG. 10 shows a schematic flow chart for the algorithm used in the system of the present invention.
Figure 11:
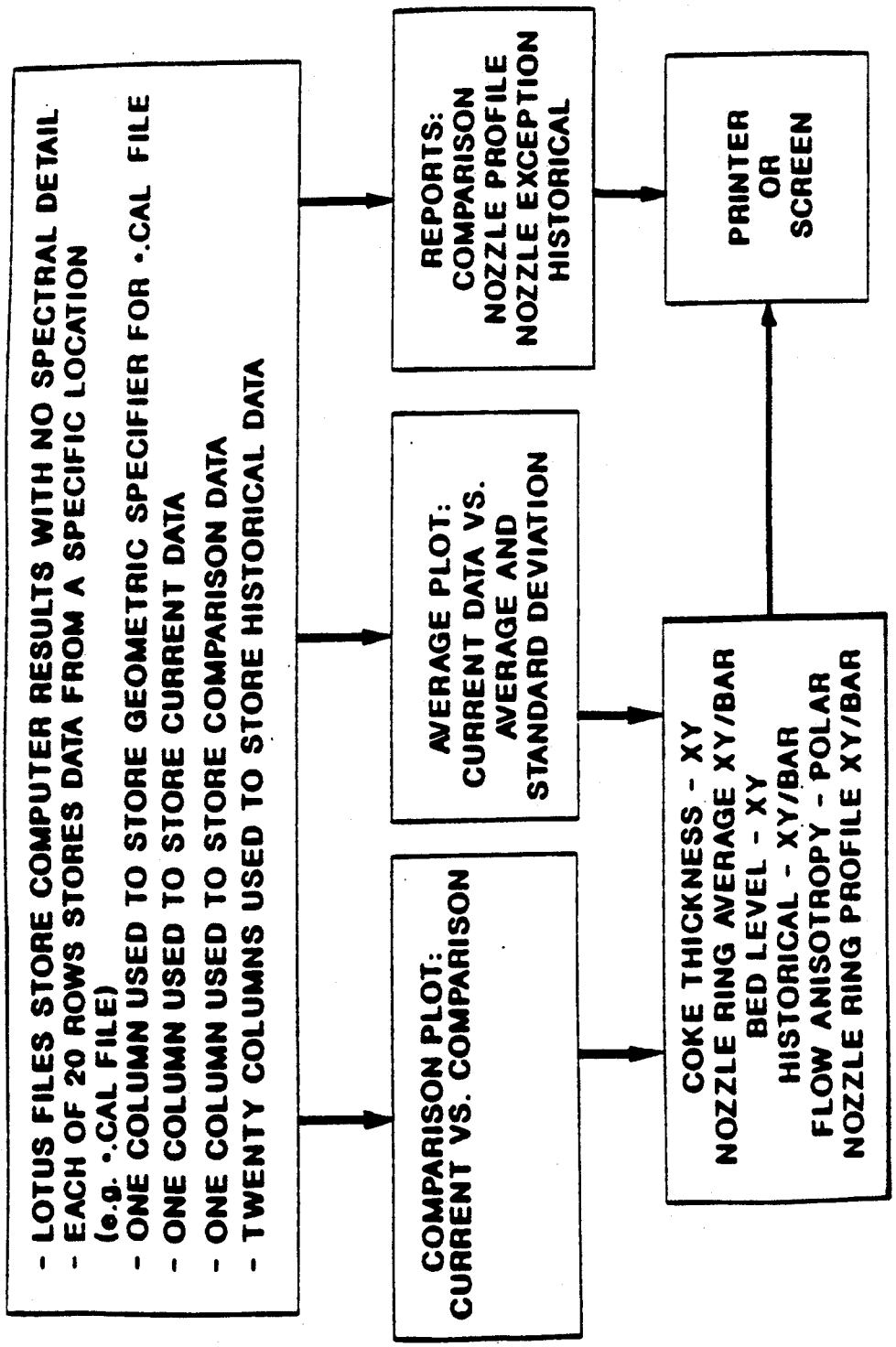
FIG. 11 shows the storage and retrieval mechanism for results extracted from the spectral analysis.

1. Commercial machinery signature analysis (MSA) hardware device are used as the data collectors. These collectors do not incorporate use of: 1) geometric position; 2) external preamplification. Therefore, the system software enables that these features can be accommodated. The overall algorithm and flow chart is shown in FIGS. 10 and 11.
2. The System permits calculation of critical spectral parameters for vibrational analysis.
   A. identification of the wall resonance frequency, $f_o$.
   B. band-limited acceleration:

$$\left[ \sum_{i=f_1}^{f_2} (a_i)^2 \right]^{0.5}$$

where:
$a_i$ = constant band-width or constant percentage band acceleration
$f_1, f_2$ = lower/upper frequency limits of the band C. automated procedures to calculate $f_1, f_2$
   1. fixed frequencies based on apriori information
   2. determined based in accord with spectral shape parameters (see FIG. 12).

Figure 12A:
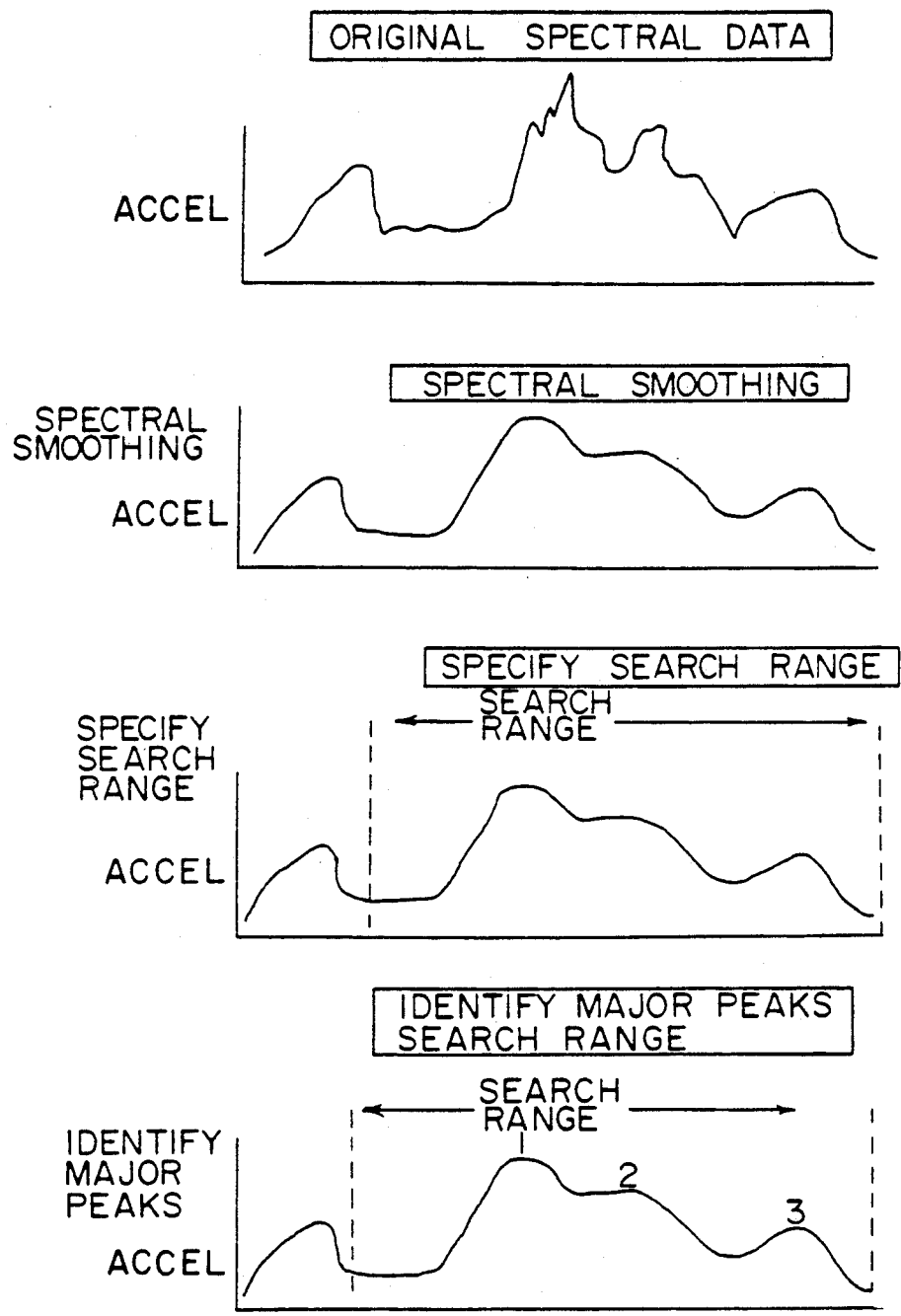
FIG. 12 shows a schematic diagram for how the system's algorithm determines the spectral peek values of interest.

FIG. 12 illustrates the major components of the automated band-limit and peak finding algorithm. A spectral smoothing procedure is utilized to facilitate peak identification. If apriori information is available, a search range can be specified where candidate peaks may be identified. Using the original (unsmoothed) data, the peaks and bandwith are located based on user selected criteria and parameters. These parameters include:
a. bandwith
b. peak height
c. proximity to other peaks
d. area of the peak and other adjacent peaks
The system has been designed to account for and identify data where no peaks or multiple peaks have been identified.
D. spectral peak values within $f_1, f_2$
E. $f_2 - f_1$
3. The system allows for any combination of the parameters described in step 2 to be algebraically manipulated. These computed results are generically called extracted results. Typically, they will correspond to the "oil signal", coke thickness, etc.
4. Once the computation in steps 2,3 are complete, the raw spectral data are no longer required. Accordingly, the System can archive the raw spectral data once the calculations in steps 2,3 are complete.
5. The extracted results from step 3 are stored/tabulated in files grouping similar data. Examples of grouped results include:
   a. "oil signal" of nozzles on a common header (ring)
   b. "steam signal" of nozzles on a common header (ring)
   c. "Chugging signal" of nozzles on a common header (ring)
   d. sets of anisotropy of data at a specific cross-section
   e. sets of vertical bed level data at a specific angular location.
   The above data grouping also retains the previous 20 results from each specific measuring location and the comparison data (see FIG. 10 and FIG. 11).
6. Data presentation
   A. special features have been included to facilitate presentation of the extracted results:
      1. Statistically compare current extracted results with other currently extracted results
      2. Statistically compare current extracted results with their historical counterparts.
7. Other (implied from above but not explicitly described)
   A. Programmability or Interactively A user can do any of the manipulations described above either interactively or in a "batch" mode where all of the required keystrokes have been saved to a file which can be modified using any standard editor.
   B. The System is, in fact, a "shell" enabling complete and substantial analysis changes without requiring any fundamental changes to the system.

What is claimed is:
1. A vibrational analysis system for converting acoustical vibratory energy of a fluidized bed system for processing material into process related information comprising:

a. a sensor for transforming vibratory energy of said fluidized bed system into electrical signals as a function of time;
b. an amplifier to increase the level of said electrical signals;
c. a data collector for converting said electrical signals from a function of time into a function of frequency;
d. a computer;
e. means to transfer said electrical signals from said data collector to said computer in which said electrical signals are algorithmically converted to process related information wherein said electrical signals are analyzed by determining band-limited acceleration; bandwidth, peak height, peak frequency, and number of peaks, and
f. means for presenting said process related information,
g. means for statistically comparing said process related information with other process related information obtained by said system either concurrently or at a previous time.

2. The vibrational analysis system of claim 1, wherein said electrical signals are transferred electrically to said computer.

3. The vibrational analysis system of claim 1, wherein said sensor is an accelerometer.

4. The vibrational analysis system of claim 1, wherein said sensor is a pressure transducer.

5. The vibrational analysis system of claim 1, wherein said process related information is the bed level of said fluidized bed system.

6. The vibrational analysis system of claim 1, wherein said process related information is bed flow uniformity.

7. The vibrational analysis system of claim 1, wherein said process related information is the measure of the accretion to the interior wall of material processed in said fluidized bed system.

8. The vibrational analysis system of claim 1, wherein said process related information is the state of the operation of the feed injectors for injecting said material into said fluidized bed system.

9. The vibrational analysis system of claim 1 wherein said electrical signals are further analyzed according to spectral smoothing.

10. The vibrational analysis system of claim 1 wherein said electrical signals are further analyzed according to peak arbitration.

* * * * *